(12) United States Patent
Acar

(10) Patent No.: US 12,061,132 B2
(45) Date of Patent: Aug. 13, 2024

(54) COMBUSTION CHAMBER LEAK DETECTION KIT IN VEHICLE ENGINES

(71) Applicant: Ilker Acar, Ankara (TR)

(72) Inventor: Ilker Acar, Ankara (TR)

( * ) Notice: Subject to any disclaimer, the term of this patent is extended or adjusted under 35 U.S.C. 154(b) by 147 days.

(21) Appl. No.: 16/076,845

(22) PCT Filed: Jul. 25, 2017

(86) PCT No.: PCT/TR2017/050342
§ 371 (c)(1),
(2) Date: Aug. 9, 2018

(87) PCT Pub. No.: WO2018/156093
PCT Pub. Date: Aug. 30, 2018

(65) Prior Publication Data
US 2021/0181055 A1    Jun. 17, 2021

(30) Foreign Application Priority Data

Feb. 27, 2017   (TR) ................. 2017/02923

(51) Int. Cl.
| | |
|---|---|
| *G01M 3/20* | (2006.01) |
| *G01M 3/02* | (2006.01) |
| *G01M 15/02* | (2006.01) |
| *G01M 15/04* | (2006.01) |
| *G01M 15/10* | (2006.01) |
| *G01N 21/80* | (2006.01) |
| *G01N 31/22* | (2006.01) |

(52) U.S. Cl.
CPC ............. *G01M 3/20* (2013.01); *G01M 3/025* (2013.01); *G01M 15/02* (2013.01); *G01M 15/042* (2013.01); *G01M 15/102* (2013.01); *G01N 21/80* (2013.01); *G01N 31/221* (2013.01)

(58) Field of Classification Search
CPC ........ G01M 3/20; G01M 3/025; G01M 15/02; G01M 15/042; G01M 15/102; G01N 21/80; G01N 31/221; F01P 11/18
See application file for complete search history.

(56) References Cited

U.S. PATENT DOCUMENTS 2,487,077 A * 11/1949 Shepherd ................. A61B 5/08
436/134
3,127,246 A *  3/1964 Carroll .................. G01M 3/025
422/86

(Continued)

FOREIGN PATENT DOCUMENTS

GB         1438913 A       6/1976

OTHER PUBLICATIONS

ISR and Written Opinion of the ISA for PCT/TR2017/050342.

*Primary Examiner* — Alexander A Mercado
(74) *Attorney, Agent, or Firm* — Egbert, McDaniel & Swartz, PLLC

(57) ABSTRACT

A detection kit for detecting combustion chamber leaks in water cooled otto or diesel vehicle engines includes a transparent solution reservoir placed in an expansion tank and/or expansion tank inlet/outlet hoses, and having low liquid and vapour permeability and high $CO_2$ permeability, a pH indicator solution placed in the solution reservoir, stable under high temperature and high pressure, and indicating combustion chamber leaks by change of colour with the change in the pH value.

4 Claims, 2 Drawing Sheets

(56) References Cited

U.S. PATENT DOCUMENTS

Figure 1:
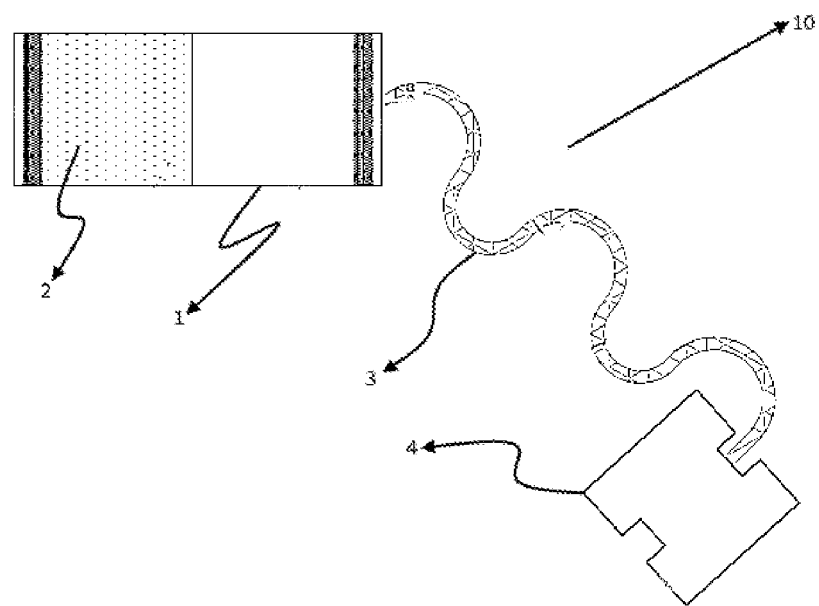

| | | | | |
|---|---|---|---|---|
| 3,625,656 A * | 12/1971 | Paulson | F01P 11/14 | 422/86 |
| 4,467,636 A * | 8/1984 | Dagn | G01M 3/26 | 138/89 |
| 4,750,350 A * | 6/1988 | Klein | G01M 3/06 | 73/49.2 |
| 4,928,687 A * | 5/1990 | Lampotang | A61M 16/0488 | 128/200.26 |
| 5,279,264 A * | 1/1994 | Simmons | F01P 7/16 | 123/41.1 |
| 5,295,747 A * | 3/1994 | Vinci | F01P 11/14 | 374/145 |
| 6,467,506 B1 * | 10/2002 | Nguyen | F01P 11/14 | 116/276 |
| 6,655,193 B1 * | 12/2003 | Liu | G01M 3/042 | 73/45.8 |
| 6,677,159 B1 * | 1/2004 | Mallow | G01N 31/223 | 436/133 |
| 6,806,092 B1 * | 10/2004 | Pool | G01N 31/223 | 436/137 |
| 8,720,445 B2 * | 5/2014 | Cain | A61L 2/206 | 128/207.14 |
| 10,995,654 B1 * | 5/2021 | Woodgrift | G01M 3/22 | |
| 2003/0092192 A1 * | 5/2003 | Pool | G01N 31/223 | 436/143 |
| 2005/0022754 A1 * | 2/2005 | Pool | G01N 31/223 | 123/41.15 |
| 2008/0247682 A1 * | 10/2008 | Murray | B65D 75/5805 | 383/104 |
| 2012/0008884 A1 * | 1/2012 | Murray | B65D 75/566 | 383/104 |
| 2012/0318040 A1 * | 12/2012 | Kratzet | G01M 15/102 | 73/23.31 |
| 2014/0151242 A1 * | 6/2014 | Thompson | G01N 27/70 | 205/775 |
| 2014/0251831 A1 * | 9/2014 | Ley | G01M 3/226 | 205/780.5 |
| 2018/0195957 A1 * | 7/2018 | Kane | G01N 21/64 | |
| 2019/0167171 A1 * | 6/2019 | Gallagher | A61B 5/14546 | |

* cited by examiner

COMBUSTION CHAMBER LEAK DETECTION KIT IN VEHICLE ENGINES

THE RELATED ART

The invention relates to a detection kit for detecting combustion chamber leaks in water cooled, internal combustion or internal burst vehicle engines. The invention particularly relates to a detection kit comprising an indicator solution made of CPP or BOPP film, which has high gas permeability, low water and vapour permeability, placed in a bag, and changes colour according to pH level, and additional components allowing this structure to be useful.

THE PRIOR ART

Nowadays, combustion chamber leaks in motors are investigated in Turkey by motor experts using roller compaction test, observation of water release on the piston or similar tests and techniques which require skills and do not give an exact result. In addition to those, in foreign countries combustion chamber leaks are identified by "combustion leak tester", in which an apparatus containing bromothymol solution, sensitive to pH change, is propped to the entrance of motor expansion tank to determine gases exiting the expansion tank contain $CO_2$, in other words with a colour change from blue to yellow meaning that the pH value is decreased under 7.6.

As well as determining motor leaks at the last stage after serious damages occurred, applications such as roller compaction test and observation of water release on piston necessitate technical understanding, expertise and intervention to motor. Considering their structures and usage, kits called combustion leak tester which is used in several countries and sensitive to $CO_2$, may give positive or negative result incorrectly because of the risk of contamination of test liquid by coolant with antifreeze or its vapour. "Combustion leak tester" has high kit and test costs. Moreover, in consequence of its structure, it can only be applied when the vehicle is immobile and its expansion tank (expansion container) or radiator cap is open; hence, it cannot be applied at real usage conditions when motor is on load. Consequently, combustion chamber leaks occurring when motor is on a certain amount of load or incipient leaks at minimum level cannot be determined with this kit.

While diesel motors are not under pressure, high air inlet occurs into the combustion chamber. Hence, prior art kits and methods may give negative results in diesel engines even if there is a leak.

Since the currently used bromothymol solution is sensitive to temperature changes, it may give false results under closed-system conditions with high pressure and high temperature which may almost reach to 120° C.

It is impossible to determine and intervene to defects on the onset with available methods and kits, which may result in combustion chamber leaks in part such as gasket, cylinder barrel, cylinder head, and pad. In time, delaceration and leaks occur in refrigerating system components like radiator and hose, since combustion chamber compaction pressure goes into the refrigerating system. As a result of this, loss of water, overheating etc. unwanted situations occur in the motor. If these problems are not detected on time, they may lead the users to high cost solutions such as rectification or replacement of the motor.

Another technical problem arising from the prior art is that coolant liquid loss caused by high or mid-level combustion chamber leaks cannot be distinguished from any direct leak caused by a deformation on coolant liquid system and wrong diagnoses cause additional expenditures.

All the tests in the prior art are conducted in places such as repair or maintenance shop with unpractical methods by people who have adequate expertise. Hence, prior art applications are far from practical use.

In U.S. Pat. No. 4,750,350, a portable apparatus which is able to check whether there is a leak between water cooled, internal combustion chamber and refrigeration crust is disclosed. A structure is disclosed which can detect the cracks in the blocks of the apparatus, leaks at the cover gasket, or similar errors and problems in the motor. The apparatus comprises a top flange, a level indicating vessel attached to conical bottom flange, a longitudinal airline, control ball space in the airline at the top part of the conical flange, and a control ball. The height of water in the apparatus is approximately 2 centimetres. When the motor is working, bubbles are observed in the liquid level indicator vessel if there is any pressure leak.

The test kits which are the subject matter of the above given patent are likely to give false positive result considering their structures and usage, because of the risk of contamination of the test liquid by coolant with antifreeze or its vapour. Moreover, the reason of observing bubbles in coolant can be air taking leaking water's place, which can be any leak in recirculation system or refrigerating units, unrelated with the motor. Said test kit has high kit and testing costs. Moreover, due to its structure, it can only be applied when the vehicle is immobile and its expansion tank or radiator cap is open; hence, it cannot be applied at real usage conditions when motor is on load. This factor is extremely important, since some leaks manifest themselves only when the motor is under serious load.

As a result, improvement is to be made in combustion chamber leak detection tests in vehicle engines, and therefore novel embodiments that would eliminate the above said drawbacks and bring solutions to the problems of the prior art systems are needed.

DESCRIPTION OF THE INVENTION

The present invention relates to a combustion chamber leak detection kit in vehicle engines eliminating all the above given disadvantages and brings certain additional advantages.

The main purpose of the invention is to provide a vehicle engine leak detection kit embodiment, which can conduct real time and continuous leak testing while the vehicle is both idle and in normal usage, and provide a practical and inexpensive use, and give exactly correct results.

Another purpose of the invention is to eliminate the possibility of false positive or negative results by completely isolating the liquid used in the invention from the vehicle cooling liquid by means of a CPP and BOPP packaging with high gas permeability, no liquid permeability, and high water vapour barrier characteristics.

Another purpose of the invention is to allow the detection kit for working without giving false results in high temperatures using a solution which shows colour changes in low pH values such as 4.4-6.2.

Another purpose of the invention is to provide a test kit embodiment that can be used by everyone easily, and to provide a test kit that is practical and gives results in five minutes without the need for having an expertise, a special place, or additional tools to use the test.

Another purpose of the invention is to provide a low cost test kit structure, and thus make motor testing in a costefficient way in every purchase and sale, periodic maintenance, or any suspicious situation.

In order to achieve the purposes of the invention, a detection kit is provided for detecting combustion chamber leaks in water cooled Otto or diesel vehicle engines, and it comprises a transparent solution reservoir placed in an expansion tank and/or expansion tank inlet/outlet hoses, and having low liquid and vapour permeability and high $CO_2$ permeability, and a pH indicator solution placed in the solution reservoir, stable under high temperature and high pressure, and indicating combustion chamber leaks by change of colour with the change in the pH value.

Another important advantage of the present invention is that, in the prior art kits and methods, the water tank gases are passed through the indicator solution via vacuum or a pump; and therefore, the $CO_2$ in the system is directly exposed to the indicator by force if there is any leak in the engine, With this technique, it is not possible to classify the leak rate in the system as low, medium or high. However, in the leak detection kit according to the invention, since the indicator is isolated in a film permeable to $CO_2$ gas, it encounters with the pH indicator according to the $CO_2$ density, due to the law of diffusion of gases. Different densities of $CO_2$ cause the pH indicator to react in different colour tones. The observed different colour tones make it possible to classify the leak rate and/or amount.

The structural and characteristic features of the invention and all of its advantages shall be understood better with the figures and the detailed description given below in reference to the figures. Therefore, the assessment should be made by taking into account the said figures and detailed explanations.

FIGURES FOR BETTER UNDERSTANDING OF THE INVENTION

FIG. 1; is a general front view of a vehicle engine combustion chamber leak detection kit.

Figure 2:
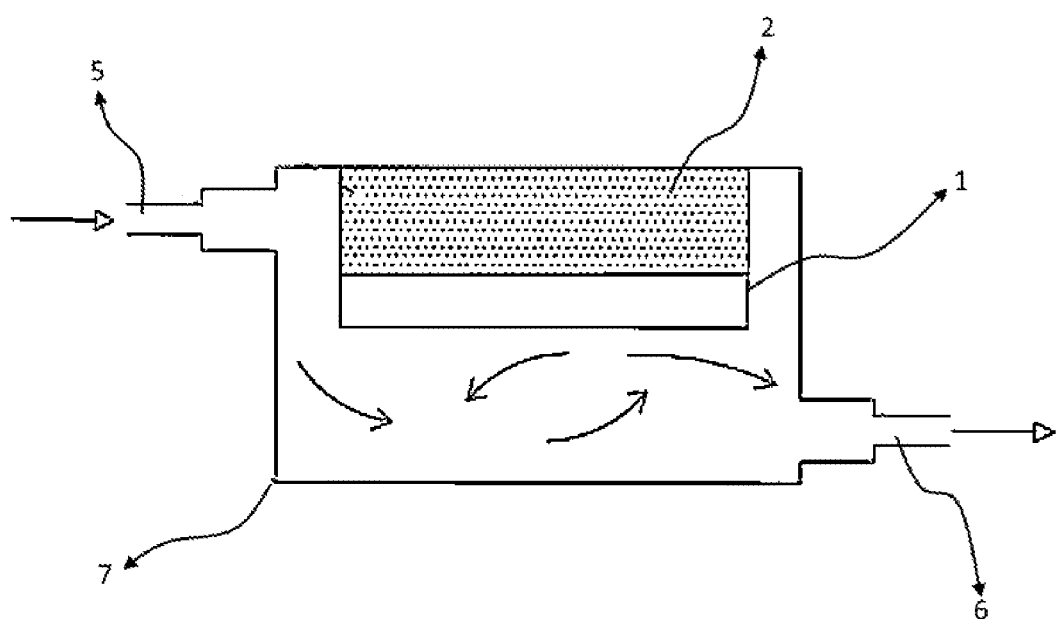

FIG. 2; is a front view of a transparent flow reservoir on which a solution reservoir containing the solution is connected.

REFERENCE NUMBERS

1. Solution reservoir
2. Solution
3. Immersion rope
4. Handgrip
5. Flow inlet
6. Flow outlet
7. Transparent flow reservoir
10. Test kit

DETAILED DESCRIPTION OF THE INVENTION

In this detailed description, the preferred embodiments of the test kit (10) according to the invention are only disclosed for better understanding of the subject without forming any limiting effect.

The test kit (10), details of which are shown in FIG. 1, in general terms consists of a solution (2) that changes colour due to the change in pH when it contacts with $CO_2$ gas; a solution reservoir (1), into which the solution (2) is placed, which has a high liquid and vapour barrier characteristic, and high $CO_2$ permeability, and made of CPP or BOPP film depending on the usage; an immersion rope (3) that is slim enough for holding the solution reservoir (1) and made of HDPE film; and a handgrip (4) connected to the immersion rope (3) that facilitates holding and using the test kit (10).

The test kit (10) according to the invention is hanged down the expansion tank or water radiator such that the solution reservoir (1) would contact the cooling water, and then the cover is closed. In order to prevent the radiator cover from affecting impermeability while driving the vehicle, the immersion rope (3) is made of high strength HDPE film. The test kit (10) according to the invention may be used optionally for both instantaneous and long term measurements. For instant measurements, the test kit (10) with solution reservoir (1) made of CPP film is used. For long term measurements such as periodic maintenance & control, the test kit (10) with solution reservoir (1) made of BOPP film which has higher water-vapour barrier feature is used.

No combustion gas is found in the coolant when water cooled internal combustion engines or internal burst engines operate properly. In case of a leak, the combustion gases mix into the coolant. Among these mixing gases, $CO_2$ has acidic characteristic. The $CO_2$ gas in the liquid can be determined by a pH indicator. General operating principle of the invention is as described above. The most fundamental characteristic of this structure is to provide a practical and low cost complete test kit (10) to the consumer, which is able to detect motor malfunctions.

The above said test kit (10) can be placed fixedly optionally on expansion tank return hose or expansion tank inlet hose so that it can directly be seen when the hood is opened. This fixed structure works as a warning system for users as soon as they open the hood.

If the combustion chamber leaks in vehicle engines are wanted to be observed constantly, the expansion tank return hose or the expansion tank inlet hose is cut and then the transparent flow reservoir (7) shown in FIG. 2 is connected to the cut part. The transparent flow reservoir (7) forms a structure which can detect leaks continuously with the flow inlet slot (5), flow outlet slot (6), and the solution reservoir (1) made of BOPP film placed in the transparent flow reservoir, and the pH indicator solution (2) found in the solution reservoir (1).

The invention claimed is:

1. A kit for detecting a combustion chamber leak in a water-cooled otto or a diesel engine, the kit comprising:
    a transparent solution reservoir immersed in a coolant in an expansion tank, wherein the transparent solution reservoir is formed of a cast polypropylene (CPP) film or a biaxially oriented polypropylene (BOPP) film that is permeable to carbon-dioxide from the coolant; and
    a pH indicator solution in said transparent solution reservoir, wherein said pH indicator solution changes color upon a change in a pH value of the coolant based on a permeation of the carbon dioxide in the coolant so as to indicate the combustion chamber leak.

2. The kit of claim 1, further comprising:
    an immersion rope squeezed to a cover of the expansion tank so as to allow said transparent solution reservoir to hang down into the expansion tank and adapted to allow said transparent solution reservoir to be immersed into the expansion tank and to be taken out of the expansion tank.

3. The kit of claim 1, wherein a transparent flow reservoir is connected between cut portions of an inlet hose or an outlet hose of the expansion tank, wherein said transparent solution reservoir has a flow inlet slot and a flow outlet slot adapted to allow direct and continuous monitoring of said pH indicator solution within said transparent solution reservoir.

4. A method for detecting a combustion chamber leak in an otto or a diesel water-cooled engine of a vehicle, the method comprising:
  storing a pH indicator solution in a transparent solution reservoir, the transparent solution reservoir being immersed in a coolant in an expansion tank, wherein the transparent solution reservoir is formed of a CPP film or a BOPP film which allows carbon dioxide to permeate into the transparent solution reservoir from the coolant; and
  indicating leaks in the combustion chamber resulting from a change of color of the pH indicator solution resulting from a change of a pH value of the coolant based on a permeation of the carbon dioxide in the coolant.

* * * * *